US012811684B2

(12) United States Patent
Goh et al.

(10) Patent No.: US 12,811,684 B2
(45) Date of Patent: Nov. 24, 2026

(54) SYSTEM AND METHOD FOR SPLIT WIRELESS AUDIO CONNECTIVITY FOR A WIRELESS HEADSET

(71) Applicant: Dell Products LP, Round Rock, TX (US)

(72) Inventors: Peng Lip Goh, Singapore (SG); Deeder M. Aurongzeb, Austin, TX (US); Eng Kang Chng, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 228 days.

(21) Appl. No.: 18/634,801

(22) Filed: Apr. 12, 2024

(65) Prior Publication Data

US 2025/0323724 A1 Oct. 16, 2025

(51) Int. Cl.

*H04B 10/114* (2013.01)
*H04B 10/66* (2013.01)
*H04R 1/10* (2026.01)

(52) U.S. Cl.

CPC ........... *H04B 10/114* (2013.01); *H04B 10/66* (2013.01); *H04R 1/1041* (2013.01); *H04R 2420/07* (2013.01)

(58) Field of Classification Search

CPC .... H04B 10/114; H04B 10/66; H04R 1/1041; H04R 2420/07

See application file for complete search history.

(56) References Cited

U.S. PATENT DOCUMENTS 5,548,654 A 8/1996 Fast
5,596,648 A 1/1997 Fast
5,710,623 A * 1/1998 Kim ...................... G06F 3/0325 356/141.5
6,510,182 B1 1/2003 Lee
7,356,156 B2 4/2008 Ruegg
11,128,376 B1 * 9/2021 Passe .................. H04W 12/082
2003/0053548 A1 3/2003 Lee
2005/0163337 A1 7/2005 Ruegg
2011/0103004 A1 * 5/2011 Brock ................ G06K 17/0022 29/428
2015/0080052 A1 * 3/2015 Jensen .............. H04M 1/72505 455/557
2015/0147067 A1 * 5/2015 Ryan .................... H04B 10/116 398/118
2015/0293876 A1 * 10/2015 Verma ................. G06F 13/4081 710/304

(Continued)

*Primary Examiner* — Darren E Wolf
(74) *Attorney, Agent, or Firm* — Prol Intellectual Property Law, PLLC; H. Kenneth Prol

(57) ABSTRACT

A system and method of splitting transceiving audio data between a peripheral device and an information handling system that includes alternating between transmitting audio data from the peripheral device to the information handling system via an infrared (IR) transmission using an IR photodiode system at the peripheral device while receiving audio data at the peripheral device from the information handling system via RF reception using an RF antenna and transmitting audio data from the peripheral device to the information handling system via a RF transmission while receiving audio data from the information handling system via the IR reception during alternating periods of time controlled by the hardware microprocessor of the peripheral device and coordinated with the information handling system.

20 Claims, 5 Drawing Sheets

(56) References Cited

U.S. PATENT DOCUMENTS

| | | | | |
|---|---|---|---|---|
| 2021/0067249 | A1* | 3/2021 | Hull | H04B 10/1143 |
| 2023/0111629 | A1* | 4/2023 | Van Wageningen | H04B 10/1129 398/118 |

* cited by examiner

SYSTEM AND METHOD FOR SPLIT WIRELESS AUDIO CONNECTIVITY FOR A WIRELESS HEADSET

FIELD OF THE DISCLOSURE

The present disclosure generally relates to audio connectivity for a wireless headset. More specifically, the present specification describes bifurcating the transmission of audio data to and audio data from a wireless headset and alternating the type of transmission method for the audio data to and audio data form the wireless headset.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more applications such as work productivity applications and gaming applications. Further, the information handling system may be operatively coupled to an audio input/output device such as a wireless headset.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
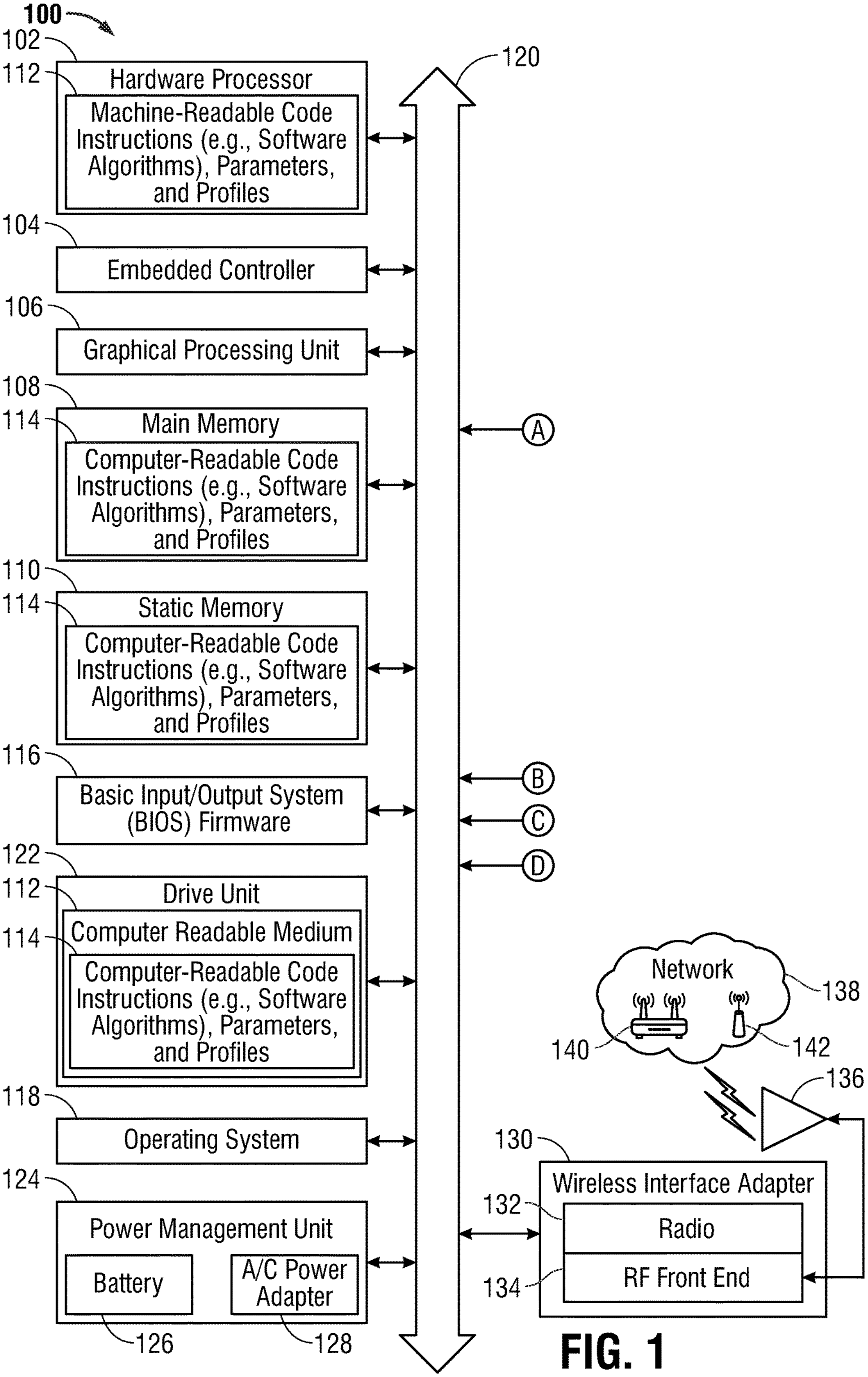
FIG. 1 is a block diagram illustrating an information handling system including a wireless headset operatively coupled to the information handling system via a dongle or a wireless headset dock according to an embodiment of the present disclosure.
Figure 1:
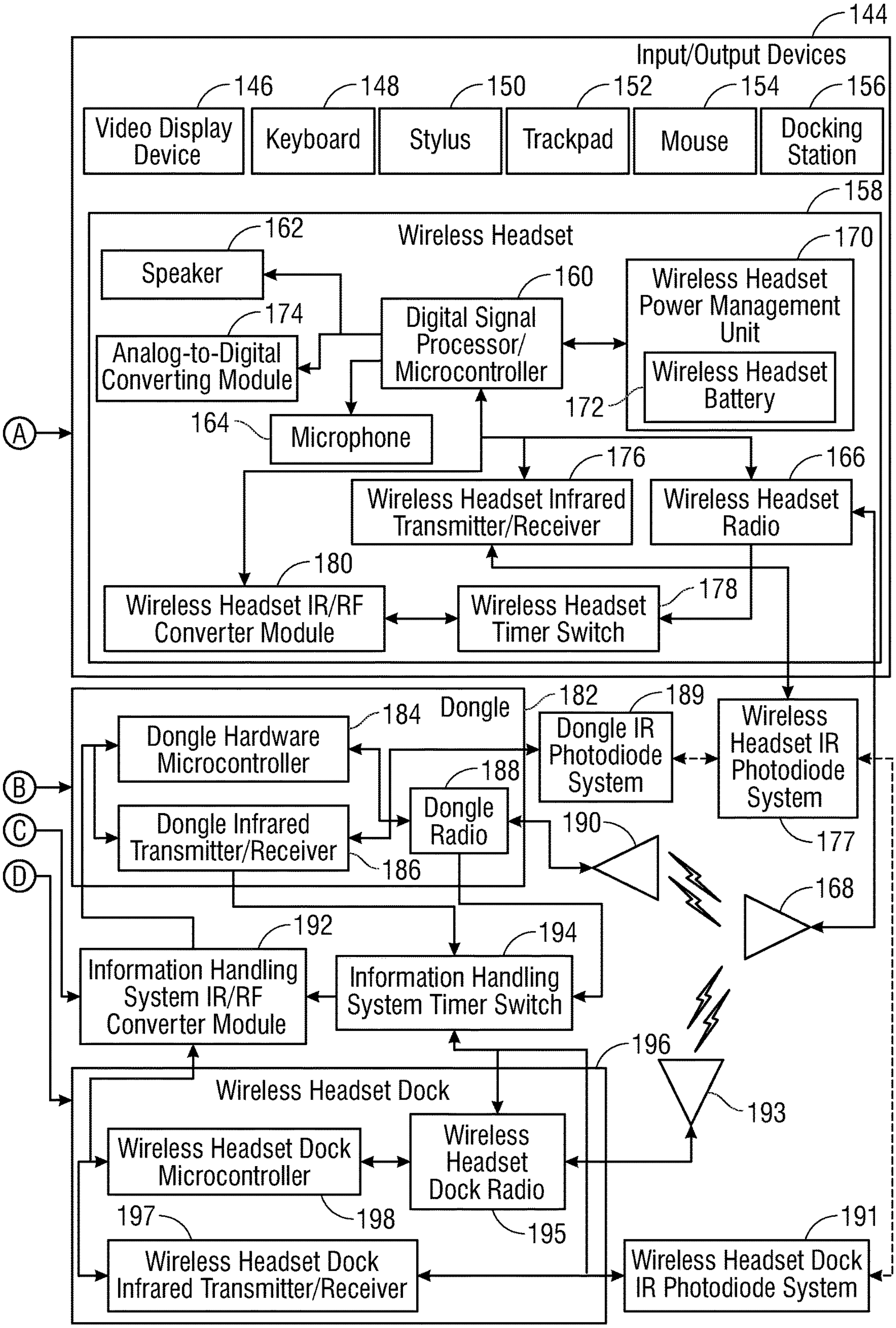

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may be operatively coupled to a plurality of input and output devices that allow a user to interact with the information handling system. The types of input may include cursor movement and selection input from a mouse and/or trackpad, keystroke input from a keyboard, and audio input into a microphone, and audio output at a speaker or other speaker driver. Often these peripheral devices may be wirelessly coupled to the information handling system via, for example, a Bluetooth® or Bluetooth Low Energy® (BLE) wireless connection. However, the wireless data (e.g., audio data transmitted to and from the peripheral device) can be intercepted and hacked. Indeed, a plurality of hacking processes such as bluebugging, blue snarfing, blue jacking, car whispering, location tracking, and blueborn attacks may be implemented by nefarious parties in order to obtain this data. These hacking tactics have proven to be significant issues when a user is trying to pair the peripheral device to the information handling system or during use of the peripheral devices after pairing.

The present specification describes a method of transceiving audio data between a peripheral device and an information handling system. The method may include periodic alternating with a hardware microprocessor of the peripheral device between transmitting audio data to the information handling system via an infrared (IR) transmission while receiving audio data from the information handling system via radio frequency (RF) reception and transmitting audio data to the information handling system via the RF transmission and receiving audio data from the information handling system via the IR reception. The method also includes converting the audio data to a digital format for output to and from the peripheral device with the hardware microprocessor. By alternating between an input and output to and from the peripheral device using these two different types of audio data transmission and reception in IR and RF, the split wireless audio data being transmitted and received has improved security since an interception would partially require presence in the room for IR communications as well as understanding how and when periodic switching between split wireless options of receiving and transmitting audio data occurs. In an embodiment, the peripheral device may include a wireless headset.

In embodiments herein, the peripheral device includes a wireless headset IR transmitter/receiver and an IR photodiode system to transmit and receive the IR transmission of periodic split wireless audio data from and to, respectively, a wireless headset dock operatively coupled to an information handling system via a wired connection. The wireless headset also has an RF radio with an antenna to transmit and receive the other periodic portions of the split wireless audio data. In this embodiment, the wireless headset dock also includes an IR transmitter/receiver with an IR photodiode system to transmit and receive, via an IR signal, a periodic portion of the split wireless audio data to and from the wireless headset. The wireless headset dock also has an RF radio and antenna to transmit and receive the other periodic portions of the split wireless audio data. In another embodiment, the peripheral device includes a wireless headset IR transmitter/receiver to transmit and receive the IR transmission of periodic split wireless audio data from and to, respectively, a dongle operatively coupled to an information handling system. The wireless headset also has an RF radio to transmit and receive the other periodic portions of the split wireless audio data. In this embodiment, the dongle also includes an IR transmitter/receiver with an IR photodiode system to transmit and receive, via an IR signal, audio data to and from the wireless headset. The dongle also includes an RF radio and antenna to transceive other portions of audio data to and from the wireless headset.

In an embodiment, the hardware microprocessor of the wireless headset may execute a timer switch to coordinate the alternating switch between the audio data being received and sent via the IR transmission and the RF. In an embodiment, the hardware microprocessor of the peripheral device may execute computer-readable program code of the wireless headset timer switch to relay, to a wireless headset dock or dongle, the frequency and occurrence of the switch between transmitting a first portion of the split wireless audio data to the information handling system via an IR transmission and receiving a second portion of split wireless audio data from the information handling system via RF transmission and transmitting the first portion of split wireless audio data to the information handling system via the RF transmission and receiving the second portion of split wireless audio data from the information handling system via the IR transmission.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 140, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 108, (volatile (e.g., random-access memory, etc.), or static memory 110, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, or any combination thereof. Additional components of the information handling system 100 may include one or more storage devices such as static memory 110 or drive unit 122. The information handling system 100 may include or interface with one or more communications ports for communicating with external devices, as well as various input and output (I/O) devices 144, such as a docking station 156, a mouse 154, a trackpad 152, a stylus 150, a keyboard 148, a video/graphics display device 146, wireless headset 158, a dongle 182, a wireless headset dock 196, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 114 that may operate on servers or systems, remote data centers, or on-box in individual client information handling systems according to various embodiments herein. In some embodiments, it is understood any or all portions of instructions (e.g., software algorithms), parameters, and profiles 114 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 108, static memory 110, and disk drive unit 122 (volatile (e.g., random-access memory, etc.), nonvolatile memory (read-only memory, flash memory etc.) or any combination thereof or other memory with computer readable medium 112 storing instructions (e.g., software algorithms), parameters, and profiles 114 executable by the hardware processor 102, EC 104, GPU 106, or any other hardware processing device. The information handling system 100 may also include one or more buses 120 operable to transmit communications between the various hardware components such as any combination of various I/O devices 144 as well as between hardware processors 102, an EC 104, the operating system (OS) 118, the basic input/output system (BIOS) 116, the wireless interface adapter 130, or a radio module, among other components described herein. In an embodiment, the hardware processor 102, EC 104, and/or GPU 106 may execute one or more bus drivers in order to transmit this data between the information handling system 100 and the input/output devices 144 described herein. In an embodiment, the information handling system 100 may be in wired or wireless communication with the I/O devices 144 such as a wireless headset 158, wireless headset dock 196, docking station 152, a keyboard 148, a mouse 154, video display device 146, stylus 150, or trackpad 152 among other peripheral devices.

As described herein, the information handling system 100 further includes a video/graphics display device 146. The video/graphics display device 146 in an embodiment may function as a liquid crystal display (LCD), an organic light emitting diode (OLED), a flat panel display, or a solid-state display. It is appreciated that the video/graphics display device 146 may be wired or wireless and may be an external video/graphics display device 146 that allows a user to increase the desktop area by extending the desktop in an embodiment. Additionally, as described herein, the information handling system 100 may include or be operatively coupled to a cursor control device (e.g., a trackpad 152, or gesture or touch screen input), a stylus 150, and/or a keyboard 148, among others that allows the user to interface with the information handling system 100 via the video/graphics display device 146. Information handling system 100 may also be operatively coupled to a peripheral device 144 such as the wireless headset 158 or other smart peripheral device having a hardware processing device such as a hardware processor, microcontroller, or other hardware processing resource and which may be further operatively coupled to one or more additional peripheral devices 144. Various drivers and hardware control device electronics may be operatively coupled to operate the I/O devices 144 according to the embodiments described herein. The present specification contemplates that the I/O devices 144 may be wired or wireless.

A network interface device of the information handling system 100 shown as wireless interface adapter 130 can provide connectivity among devices such as with Bluetooth® or to a network 138, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the wireless peripheral devices including the wireless headset 158, via, for example, a Bluetooth® or Bluetooth® Low Energy (BLE) protocols. In other embodiments, Bluetooth®, BLE or other WPAN or WLAN may be used for communication with a wireless peripheral device such as the wireless headset 158 from the dongle 182 or wireless headset dock 196. In an embodiment, the WAN, WWAN, LAN, and WLAN may each include an AP 140 or base station 142 used to operatively couple the information handling system 100 to a network 138. In a specific embodiment, the network 138 may include macro-cellular connections via one or more base stations 142 or a wireless AP 140 (e.g., Wi-Fi), or such as through licensed or unlicensed WWAN small cell base stations 142. Connectivity may be via wired or wireless connection. For example, wireless network wireless APs 140 or base stations 142 may be operatively connected to the information handling system 100. Wireless interface adapter 130 may include one or more radio frequency (RF) subsystems (e.g., radio 132) with transmitter/receiver circuitry, modem circuitry, one or more antenna RF front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 138 may communicate voice, video, or data over the network 138. Further, the instructions 114 may be transmitted or received over the network 138 via the network interface device or wireless interface adapter 130.

The information handling system 100 may include a set of instructions 114 that may be executed to cause the computer system to perform any one or more of the methods or computer-based functions disclosed herein. For example, instructions 114 may be executed by a hardware processor 102, GPU 106, EC 104 or any other hardware processing resource and may include software agents, or other aspects or components used to execute the methods and systems described herein. Various software modules comprising application instructions 114 may be coordinated by an OS 118, and/or via an application programming interface (API) include a unified device API described herein. An example OS 118 may include Windows®, Android®, and other OS types. Example APIs may include Win 32, Core Java API, or Android APIs.

In an embodiment, the information handling system 100 may include a disk drive unit 122. The disk drive unit 122 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 108 and static memory 110 may also contain a computer-readable medium for storage of one or more sets of machine-readable code instructions, parameters, or profiles 114 described herein. The disk drive unit 122 or static memory 110 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 108, the static memory 110, and/or within the disk drive 122 during execution by the hardware processor 102, EC 104, or GPU 106 of information handling system 100.

Main memory 108 or other memory of the embodiments described herein may contain computer-readable medium (not shown), such as RAM in an example embodiment. An example of main memory 108 includes random access memory (RAM) such as static RAM (SRAM), dynamic RAM (DRAM), non-volatile RAM (NV-RAM), or the like, read only memory (ROM), another type of memory, or a combination thereof. Static memory 110 may contain computer-readable medium (not shown), such as NOR or NAND flash memory in some example embodiments. The applications and associated APIs, for example, may be stored in static memory 110 or on the disk drive unit 122 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 124 (a.k.a. a power supply unit (PSU)). The PMU 124 may include a hardware controller and executable machine-readable code instructions to manage the power provided to the components of the information handling system 100 such as the hardware processor 102 and other hardware components described herein. The PMU 124 may control power to one or more components including the one or more drive units 122, the hardware processor 102 (e.g., CPU), the EC 104, the GPU 106, a video/graphic display device 146, or other wired I/O devices 144 such as the mouse 154, the stylus 150, the keyboard 148, the wireless headset 158, dongle 182, wireless headset dock 196, and the trackpad 152 and other components that may require power when a power button has been actuated by a user. In an embodiment, the PMU 124 may monitor power levels and be electrically coupled to the information handling system 100 to provide this power. The PMU 124 may be coupled to the bus 120 to provide or receive data or machine-readable code instructions. The PMU 124 may regulate power from a power source such as the battery 126 or AC power adapter 128. In an embodiment, the battery 126 may be charged via the AC power adapter 128 and provide power to the components of the information handling system 100, via wired connections as applicable, or when AC power from the AC power adapter 128 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may include a wireless peripheral device that is capable of receiving and transmitting audio data for the user of the peripheral device can hear audio output from the information handling system 100 and provide audio output to the information handling system 100. In an embodiment, the wireless headset 158 may include one or more speakers 162 for the user to hear the audio output from the information handling system 100. In an embodiment, the wireless headset 158 may include a microphone 164 for the user to provide audio input to the wireless headset 158 for the wireless headset 158 to transmit that audio input to the information handling system 100. In an embodiment, the wireless headset may have two earpieces (not shown) that each house a speaker 162 and is formed to fit onto or over the user's ears when worn. A headband may operatively couple the two earpieces together such that, when worn by the user, rests on top of the head with the earpieces positioned over or on the user's ears.

The wireless headset 158 also includes a DSP or other microcontroller 160 that executes computer-readable program code associated with the devices and systems within the wireless headset 158. In an embodiment, the DSP or other microcontroller 160 may execute computer-readable program code of an analog-to-digital converting module 174 to convert analog audio data into digital audio data such as when the user provides audio input into the microphone 164. In an embodiment, the DSP or other microcontroller 160, speaker 162, and microphone 164, as well as a wireless headset radio 166 and wireless headset IR transmitter/receiver 176 described herein may be powered by a wireless headset PMU 170. The wireless headset PMU 170 may include a hardware controller and executable machine-readable code instructions to manage the power provided to the components of the wireless headset 158. In an embodiment, the wireless headset PMU 170 may monitor power levels and be electrically coupled to the wireless headset to provide this power. The wireless headset PMU 170 may regulate power from a power source such as the wireless headset battery 172.

In an embodiment, the wireless headset 158 may include a wireless headset radio 166 and wireless headset antenna 168 to transmit and receive, via RF transmission, audio data from and to one of a dongle 182, wireless headset dock 196, or information handling system. It is appreciated that this RF transmission may include those radio frequencies associated with Bluetooth® and BLE® wireless transmissions such as 2.4 GHz as well other Bluetooth® and BLE® frequency ranges. As described herein, the DSP or other microcontroller 160 of the wireless headset 158 may use to wireless headset radio 166 and wireless headset antenna 168 to transmit or receive a portion of the audio data exchanged between the wireless headset 158 and one of the dongle 182, the wireless headset dock 196, or the information handling system 100. In an embodiment, the execution of a wireless headset timer switch 178 by the DSP or other microcontroller 160 may coordinate when the wireless headset radio 166 is to transmit audio data from the microphone 164 to the one of the dongle 182, the wireless headset dock 196, or the information handling system 100 and when the wireless headset radio 166 is to receive audio data via antenna 168 from one of the dongle 182, the wireless headset dock 196, or the information handling system 100. In an example embodiment, execution of the wireless headset timer switch 178 by the DSP or other microcontroller 160 causes the wireless headset radio 166 to transmit audio input received at the microphone 164 as audio data for a period of time before causing the wireless headset radio 166 and antenna 168 to be used to receive audio input from the information handling system 100 or other audio source. In an embodiment, the execution of the wireless headset timer switch 178 by the DSP or other microcontroller 160 of the wireless headset 158 may cause the DSP or other microcontroller 160 to determine the frequency and occurrence of the switch between receiving audio data from the information handling system 100 via RF transmission at the wireless headset radio 166 of the wireless headset 158 and transmitting audio data to the information handling system 100 via RF transmission at the wireless headset radio 166 of the wireless headset 158.

In an embodiment, the wireless headset 158 further includes a wireless headset IR transmitter/receiver 176 with a headset IR photodiode system 177. The wireless headset IR transmitter/receiver 176 with a headset IR photodiode system 177 may be used to transmit and receive audio data IR signals to and from, respectively, the wireless headset 158 and the information handling system 100 dongle 182 with a dongle IR photodiode system 189 or a wireless headset dock 196 with a dock IR photodiode system 191. In other embodiments, the information handling system 100 may have a IR photodiode system (not shown) built in with an internal IR transmitter/receiver. In an embodiment, the wireless headset IR transmitter/receiver 176 is operatively coupled to a headset IR photo diode system 177 formed on an exterior surface of the wireless headset 158 such as on the earpieces or on a boom used to house the microphone 164. The IR transmissions received at the wireless headset may be converted into a digital audio signal with the DSP or other microcontroller 160 executing computer-readable program code of a wireless headset IR/RF converter module 180. The wireless headset IR/RF converter module 180 may be any type of light-to-digital converter and the present specification contemplates that any module, hardware, and/or firmware/software may be used to convert the incoming IR transmissions into a digital audio format for the DSP or other microcontroller 160 to provide audio output to the speakers 162.

Again, the DSP or other microcontroller 160 may execute the computer-readable program code of the wireless headset timer switch 178 to coordinate when the wireless headset IR transmitter/receiver 176 is to transmit audio data via the wireless headset IR photodiode system 177 from the microphone 164 to and when the wireless headset IR transmitter/receiver 176 with wireless headset IR photodiode system 177 is to receive audio data from one of the dongle 182 with the dongle IR photodiode system 189, the wireless headset dock 196 with a dock IR photodiode system 191, or the information handling system 100 with an IR photodiode system built in various embodiments. In an example embodiment, execution of the wireless headset timer switch 178 by the DSP or other microcontroller 160 causes the wireless headset IR transmitter/receiver 176 to transmit audio input received at the microphone 164 for a period of time before causing the wireless headset radio 166 to be used to receive audio input from the information handling system 100 or other audio source. In an embodiment, the execution of the wireless headset timer switch 178 by the DSP or other microcontroller 160 of the wireless headset 158 may cause the DSP or other microcontroller 160 to determine the frequency and occurrence of the switch between receiving audio data from the information handling system 100 via IR transmission at the wireless headset radio 166 of the wireless headset 158 and transmitting audio data to the information handling system 100 via IR transmission at the wireless headset radio 166 of the wireless headset 158.

It is appreciated that as the execution of the wireless headset timer switch 178 by the DSP or other microcontroller 160 causes the wireless headset radio 166 to transmit audio data received at the microphone 164 to the dongle 182, wireless headset dock 196, or information handling system 100 via an RF wireless link, the DSP or other microcontroller 160 is concurrently receiving audio data input from the information handling system 100 via the wireless headset IR transmitter/receiver 176 in an IR wireless link. After a period of time coordinated between the headset 158 and the information handling system 100, dongle 182, or wireless headset dock 196, the processes of the wireless headset radio 166 and wireless headset IR transmitter/receiver 176 are switched such that the wireless headset radio 166 is now receiving audio input from the information handling system via an RF transmission while the wireless headset IR transmitter/receiver 176 is transmitting audio data at the microphone 164 to the dongle 182, the wireless headset dock 196, or the information handling system 100 via an IR wireless link. By setting a frequency of switching and occurrence of the wireless headset timer switch 178, audio data being sent and received is consistently bifurcated into two different methods of transmission (e.g., RF and IR) with the audio data from the microphone 164 being sent using a first transmission method while audio data to the speakers 162 is received using a second transmission method and, after a period of time, audio data from the microphone 164 is sent using the second transmission method while audio data to the speakers 162 is received using the first transmission method. In an embodiment, the frequency of switching may be set to, for example, every 30 seconds. The present specification, however, contemplates that the frequency of the switching may be more frequent or less frequent in various embodiments. Further, the period of switching may be adjusted continuously among periods of switching occurrences in other embodiments and initially coordinated between the headset 158, and the dongle 182, wireless headset dock 196, or information handling system 100.

As described herein, the wireless headset 158 is operatively coupled to a dongle 182 in an embodiment. The dongle 182 may be a device with a dongle antenna 190 and a dongle IR photodiode system 189 that receives the RF transmissions and IR transmissions from the wireless headset 158 in an embodiment. The wireless headset 158 includes the wireless headset radio 166 and wireless headset antenna 168 for transmission or reception of RF signals to the dongle 182. The wireless headset 158 also includes a IR transmitter/receiver 176 with IR photodiode system 177 for transmission and reception of IR signals with dongle 182. The dongle 182 may receive the RF transmissions and IR transmissions with a dongle antenna 190 and a dongle IR photodiode system 189 from the wireless headset 158 or transmit to the same as described in embodiments herein. The dongle 182 may include a dongle hardware microcontroller 184 that operates the dongle radio 188 (with its dongle antenna 190) and the dongle IR transmitter/receiver 186 with its dongle IR photodiode system 189 to transmit and receive the audio data to the wireless headset 158 as described herein. In an embodiment, the dongle radio 188 and dongle IR transmitter/receiver 186 are operatively coupled to an information handling system timer switch 194 that includes computer-readable program code instructions executable by the hardware processor 102 of the information handling system. Similar to the wireless headset timer switch 178, the information handling system timer switch 194 may coordinate when the dongle 182 is to transmit or receive audio data from the information handling system 100 to the wireless headset 158 between RF and IR transmissions. In an embodiment, one of the wireless headset timer switch 178 and the information handling system timer switch 194 may act as a master device that sets the frequency and timing of the switch between transmitting audio data via RF transmissions while receiving audio data via IR transmissions and transmitting audio data via IR transmissions while receiving audio data via RF transmissions. In an embodiment, the wireless headset timer switch 178 of the wireless headset 158 may act as the master timer switch such that data indicating the frequency and timing of the switch between transmitting audio data via RF transmissions while receiving audio data via IR transmissions and transmitting audio data via IR transmissions while receiving audio data via RF transmissions is sent to the dongle hardware microcontroller 184 and relayed and used by the hardware processor 102 of the information handling system to coordinate the switching of the transmission methods.

As described herein, the dongle 182 includes a dongle IR transmitter/receiver 186 with a dongle IR photodiode system 189. The dongle IR transmitter/receiver 186 may operate similar to the wireless headset IR transmitter/receiver 176 such that it can transmit and receive audio signals via IR transmissions using the dongle IR photodiode system 189. In an embodiment, the dongle IR transmitter/receiver 186 may be operatively coupled to the dongle IR photodiode system 189 built into the housing of the dongle 182 and may be arranged within the housing to be within the line of sight of the wireless headset IR photodiode system 177 of the wireless headset IR transmitter/receiver 176 so that IR transmissions can be received and transmitted. The dongle IR transmitter/receiver 186 may be operatively coupled to an information handling system IR/RF converter module 192 that converts the IR transmissions into a digital audio signal. The information handling system IR/RF converter module 192 may be any type of light-to-digital converter and the present specification contemplates that any module, hardware, and/or firmware/software may be used to convert the incoming IR transmissions into a digital format for the hardware processor to provide audio output to other devices remote from the information handling system 100 over the network 138 during, for example, a videoconferencing session, an online gaming session, and the like.

The wireless headset 158 may be wirelessly coupled to a wireless headset dock 196 in another embodiment. The wireless headset dock 196 may be configured to dock with the wireless headset 158 when not in use and may include wireless or wired charging capabilities that charge the wireless headset battery 172 when the user has mounted the wireless headset 158 onto the wireless headset dock 196. The wireless headset dock 196 may be operatively coupled to the information handling system 100 via a wired or wireless connection. In an embodiment, the wired connection may include a universal serial bus (USB) connection that may be inserted into a USB port of the information handling system 100. Similar to the dongle 182, the wireless headset dock 196 may include a wireless headset dock radio 195 and wireless headset dock antenna 193 to transmit RF audio data to the wireless headset 158. Additionally, the wireless headset dock 196 includes a wireless headset dock IR transmitter/receiver 197 and a wireless headset dock IR photodiode system 191 to also transmit and receive IR transmissions from the wireless headset dock 196 to the wireless headset 158.

The wireless headset dock 196 may also include a wireless headset dock microcontroller 198 that controls the operation of the wireless headset dock radio 195 and wireless headset dock IR transmitter/receiver 197. As described herein, the operation of the wireless headset dock IR transmitter/receiver 197 with its wireless headset dock IR photodiode system 191 and wireless headset dock radio 195 with its wireless headset dock antenna 193 transmit the audio data as described herein. In an embodiment, the wireless headset dock microcontroller 198 and the dongle radio 188 may be operatively coupled to the information handling system timer switch 194 that includes computer-readable program code instructions executable by the hardware processor 102 of the information handling system. Similar to the wireless headset timer switch 178, the information handling system timer switch 194 may coordinate when the wireless headset dock 196 is to transmit audio data from the information handling system 100 to the wireless headset 158. In an embodiment, one of the wireless headset timer switch 178 and the information handling system timer switch 194 may act as a master device that sets the frequency and timing of the switch between transmitting audio data via RF transmissions while receiving audio data via IR transmissions and transmitting audio data via IR transmissions while receiving audio data via RF transmissions. In an embodiment, the wireless headset timer switch 178 of the wireless headset 158 may act as the master timer switch such that data indicating the frequency and timing of the switch between transmitting audio data via RF transmissions while receiving audio data via IR transmissions and transmitting audio data via IR transmissions while receiving audio data via RF transmissions is sent to the wireless headset dock microcontroller 198 and relayed and used by the hardware processor 102 of the information handling system 100 to coordinate the switching of the transmission methods.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
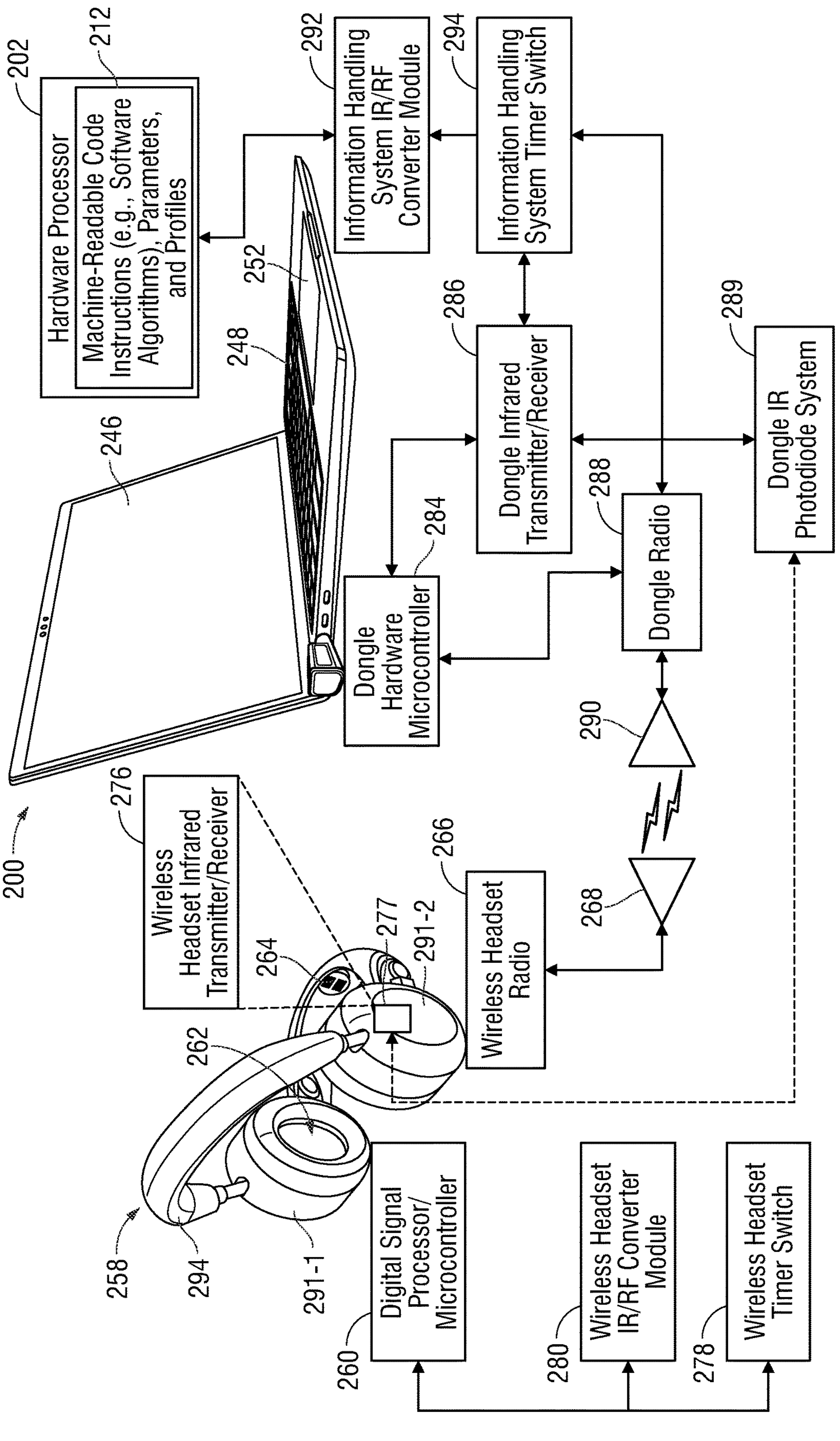
FIG. 2 is a graphic diagram depicting an information handling system including a wireless headset operatively coupled to the information handling system via a dongle according to an embodiment of the present disclosure.

FIG. 2 is a graphic diagram depicting an information handling system 200 with a wireless headset 258 operatively coupled to the information handling system 200 via a dongle 282 according to an embodiment of the present disclosure. The information handling system 200 shown in FIG. 2 is shown as a laptop-type information handling system 200. However, the present specification contemplates that any type of information handling system 200, including those operatively coupled to a docking station with the dongle 282 operatively coupled to the docking station in an embodiment. The information handling system 200 shown in FIG. 2 also includes a built-in keyboard 248 and trackpad 252 that both allow a user to provide input to the information handling system 200. In an embodiment, the information handling system 200 may include a number of ports into which the dongle 282 may be operatively coupled to the information handling system 200. In an embodiment, the dongle 282 may include a USB port adapter to be operatively coupled to the information handling system 200 via a USB port.

The wireless headset 258 may be wirelessly coupled to the information handling system 200 in an embodiment via a RF wireless link and an IR link. The wireless coupling of the wireless headset 258 to the information handling system 200 may be accomplished by the user initiating the wireless headset 258 and information handling system 200 and engaging in, for example, WiFi, Bluetooth®, or other RF communication protocol pairing processes. When the user initiates the wireless headset 258, the DSP or other microcontroller 260 of the wireless headset 258 may engage in this pairing process in order to allow for data such as audio data to be transmitted from and received at the wireless headset 258. Similarly, for infrared pairing the wireless headset 258 to the information handling system 200, a wireless headset IR photodiode system 277 may transmit an IR pairing signal which is received by, in the example shown in FIG. 2, a dongle IR photodiode system 289 that includes pairing data such as pairing authorization data. Thus, in an embodiment, the pairing process may proceed using an IR transmission as an alternative to an RF transmission during split wireless audio connectivity and may be periodically switched as described in embodiments herein.

It is appreciated that the wireless headset 258 may be used by the user to provide audio input to the information handling system 200 via a microphone 264 formed in, for example, a boom of the wireless headset 258. The DSP or other microcontroller 260, in an embodiment, may execute computer-readable program code instructions of an analog-to-digital converting module (not shown) in order to convert the analog audio signal from the microphone 264 into digital signal audio data for transmission from the wireless headset 258 to the information handling system 200 via operation of the wireless headset radio 266 and wireless headset antenna 268 or the wireless headset IR transmitter/receiver 276 with a wireless headset IR photodiode system 277 as described herein. The wireless headset 258 also includes one or more speakers 262 to provide audio output from received audio data to the user. As described in embodiments herein, the wireless headset 258 may include two wireless headset earpieces 291-1, 291-2 that are operatively coupled to a headband 291 such that wireless headset earpieces 291-1, 291-2 may be placed over or onto the user's ears when the user is wearing the wireless headset 258. As described herein, the transmission of audio data to the wireless headset 258 or reception from the wireless headset 258 may be periodically and alternately conducted by the information handling system 200 by operation of a dongle radio 288 and dongle antenna 290 or a dongle IR transmitter/receiver 286 with a dongle IR photodiode system 289 in an embodiment. In another embodiment, the transmission of audio data to the wireless headset 258 or reception from the wireless headset 258 may be periodically and alternately conducted by the information handling system 200 by operation of an integrated radio (not shown) and an integrated antenna or an integrated IR transmitter/receiver with an integrated IR photodiode system 289 (not shown) in an embodiment where the dongle functions are integrated within the information handling system 200.

As described herein, the DSP or other microcontroller 260 may also execute computer-readable program code instructions of a wireless headset timer switch 278 that initially determines whether audio data from the microphone 264 is to be transmitted to the information handling system 200 using the wireless headset radio 266 or the wireless headset IR transmitter/receiver 276. Additionally, execution of the computer-readable program code instructions of the wireless headset timer switch 278 causes the DSP or other microcontroller 260 to determine whether the audio input from the information handling system 200 is to be received via the wireless headset IR transmitter/receiver 276 or the wireless headset radio 266. In an example embodiment, where the audio data for output at the speakers 262 is to be received from the information handling system 200 with a wireless headset radio 266 using a RF transmission signal via antenna 268, the transmission of the audio data from the microphone 264 is to be transmitted to the information handling system 200 with the wireless headset IR transmitter/receiver 276 using an IR transmission signal via the wireless headset IR photodiode system 277. This bifurcates the audio data input and audio data output to and from the wireless headset 258 using two different transmission protocols and two different forms of wireless transmissions thereby securing the audio data with split wireless audio connectivity and protecting from those hacking attacks described herein.

The execution of the computer-readable program code instructions of the wireless headset timer switch 278 determines the timing of the occurrence and the frequency of occurrence when the transmission protocol and form of wireless communication (RF or IR) used to transmit the audio data and receive the audio data is switched. Continuing with the example, the execution of the computer-readable program code instructions of the wireless headset timer switch 278 by the DSP or other microcontroller 260 causes the audio data for output at the speakers 262 to switch from being received from the information handling system 200 via a wireless headset radio 266 using a RF transmission signal to being received from the information handling system 200 via a wireless headset IR transmitter/receiver 276 using an IR transmission signal. Concurrently, the execution of the computer-readable program code instructions of the wireless headset timer switch 278 causes the audio data from the microphone 264 to switch from being transmitted to the information handling system 200 via the wireless headset IR transmitter/receiver 276 using an IR transmission signal to being transmitted to the information handling system 200 via the wireless headset radio 266 using an RF transmission signal in some embodiments herein. This transmission protocol switching adds further security to the audio data being received and transmitted from and to the wireless headset 258 such that even if a hacker was to gain access to this data using a Bluetooth® eavesdropping method described herein, the sections of data obtained are not complete and input and output audio data would be secured. In an embodiment, the execution of the computer-readable program code instructions of the wireless headset timer switch 278 may cause the transmission protocols and form of wireless communications (RF or IR) to be switched at any interval of time such as over milliseconds, seconds, or minutes. Further, the interval of time may be a sliding or shifting interval of time coordinated between the DSP of the wireless headset 258 and the dongle hardware microcontroller 284 or the information handling system 200. Where the frequency of switching from a first transmission protocol and a first form of wireless connectivity to a second transmission protocol a second form of wireless connectivity is conducted or shifts as to period selected, the ability of a hacker to eavesdrop on this data becomes more difficult such that the eavesdropper will only be able to gather data this is jumbled and unusable when not hacked into both forms of wireless connectivity and not having the period of switching.

In order to transmit and receive audio data from the wireless headset 258 using the wireless headset IR transmitter/receiver 276, the DSP or other microcontroller 260 may further execute computer-readable program code instructions of a wireless headset IR/RF converter module 280. Where the audio data is received from the information handling system 200 via the wireless headset IR transmitter/receiver 276 with wireless headset IR photodiode system 277 using the IR transmission protocol, the execution of the computer-readable program code instructions of the wireless headset IR/RF converter module 280 may convert the IR signals defining the audio data into digital signal audio data prior to the DSP or other microcontroller 260 providing this digital audio signal to the speakers 262 of the wireless headset 258. Similarly, in those instances where the wireless headset IR transmitter/receiver 276 is used to transmit the audio data received from the microphone 264, the DSP or other microcontroller 260, after executing the computer-readable program code instructions of the analog-to-digital converting module, may execute the computer-readable program code instructions of the wireless headset IR/RF converter module 280 to convert the digital audio signal that defines the audio data output into an IR transmission signal for the wireless headset IR transmitter/receiver 276 to transmit that audio data. In an embodiment, the RF data received at and sent from the wireless headset 258 is also converted into digital data using the wireless headset IR/RF converter module 280.

In an alternate embodiment, the split wireless audio connectivity may be arranged in a different way such that the wireless headset IR transmission and reception system 276 takes off a portion of the audio data prepared for RF transmission or reception from the wireless headset radio 266 to provide for split wireless audio connectivity. For example, the DSP or other microcontroller 260 provides for audio data to be prepared for RF transmission or reception and further executing computer-readable program code instructions of a wireless headset IR/RF converter module 280 converts the RF data to IR data at the wireless headset radio to split a portion out for transmission via the wireless headset IR transmission and reception system 276 and wireless headset IR photodiode system 277 in this alternate embodiment. In such an embodiment, the wireless headset IR photodiode system 277 may also receive IR wireless data having audio data and convert with the DSP or other microcontroller 260 may further execute computer-readable program code instructions of a wireless headset IR/RF converter module 280 for the wireless headset radio 286 to receive such audio data and the DSP or other microcontroller 260 to utilize the data streams for the speakers 291-1 or 291-2 in other embodiments.

As described herein, the dongle 282 may include a dongle IR transmitter/receiver 286 and dongle IR photodiode system 289 that may send audio data to the wireless headset 258 or receive audio data from the wireless headset 258 depending on input or output audio data is using the IR transmission protocol as described herein. As such, where the audio data from the microphone 264 of the wireless headset 258 is to be transmitted using the IR transmission protocol based on the operation of the wireless headset timer switch 278, the dongle 282 may receive that audio data at the dongle IR transmitter/receiver 286 with the dongle IR photodiode system 289 built thereon. Additionally, where audio data is to be transmitted to the wireless headset 258 to be provided at the speakers 262 of the wireless headset 258 based on the operation of the wireless headset timer switch 278, the dongle 282 may transmit that audio data via the dongle IR transmitter/receiver 286 with the dongle IR photodiode system 289 built thereon. Concurrently, where the audio data from the microphone 264 of the wireless headset 258 is to be transmitted using the RF transmission protocol based on the operation of the wireless headset timer switch 278, the dongle 282 may receive that audio data at the dongle radio 288 built thereon. Additionally, where audio data is to be transmitted to the wireless headset 258 to be provided at the speakers 262 of the wireless headset 258 based on the operation of the wireless headset timer switch 278, the dongle 282 may transmit that audio data via the dongle radio 288 therein.

As described herein, the information handling system 200 includes an information handling system timer switch 294. In an embodiment, the dongle radio 288 and dongle IR transmitter/receiver 286 is operatively coupled to an information handling system timer switch 294 that includes computer-readable program code instructions executable by the hardware processor 202 of the information handling system 200. Similar to the wireless headset timer switch 278, the information handling system timer switch 294 may coordinate when and with which type of wireless communications the dongle 282 is to transmit audio data from the information handling system 200 to the wireless headset 258 and receive audio data from the information handling system 200. In an embodiment, one of the wireless headset timer switch 278 and the information handling system timer switch 294 may act as a master device that sets the frequency of occurrence and timing of the occurrence of the switch between transmitting audio data via RF transmissions while receiving audio data via IR transmissions and transmitting audio data via IR transmissions while receiving audio data via RF transmissions. In an embodiment, the wireless headset timer switch 278 of the wireless headset 258 may act as the master timer switch such that data indicating the frequency of occurrence and timing of the occurrence of the switch between transmitting audio data via RF transmissions while receiving audio data via IR transmissions and transmitting audio data via IR transmissions while receiving audio data via RF transmissions is sent to the dongle hardware microcontroller 284 and relayed and used by the hardware processor 202 of the information handling system 200 to coordinate later switching of the transmission methods.

The information handling system 200 also includes an information handling system IR/RF converter module 292. The hardware processor 202 of the information handling system 200 may execute computer-readable program code instructions (e.g., machine-readable code instructions 212) of the information handling system IR/RF converter module 292 to convert any IR data or RF data into digital audio data and vise-versa depending on the type do wireless communications being used for transmitting or receiving the audio data. For example, where the audio data is received from the wireless headset 258 via the dongle IR transmitter/receiver 286 using the IR transmission protocol, the execution of the computer-readable program code instructions of the information handling system IR/RF converter module 292 at the information handling system 200 may convert the IR signals of the audio data into digital audio signals prior to the hardware processor 202 transmitting this digital audio signal to, for example, another remote information handling system during a videoconferencing session or online gaming session. Similarly, in those instances where the wireless headset IR transmitter/receiver 286 at the information handling system 200 is used to transmit the digital audio data received from a remote information handling system, the hardware processor 202, after executing the computer-readable program code instructions of the information handling system IR/RF converter module 292 to convert the digital audio signal that defines the audio output into an IR transmission signal for the dongle IR transmitter/receiver 286 to transmit that data to the wireless headset 258 using the dongle IR photodiode system 289.

Figure 3:
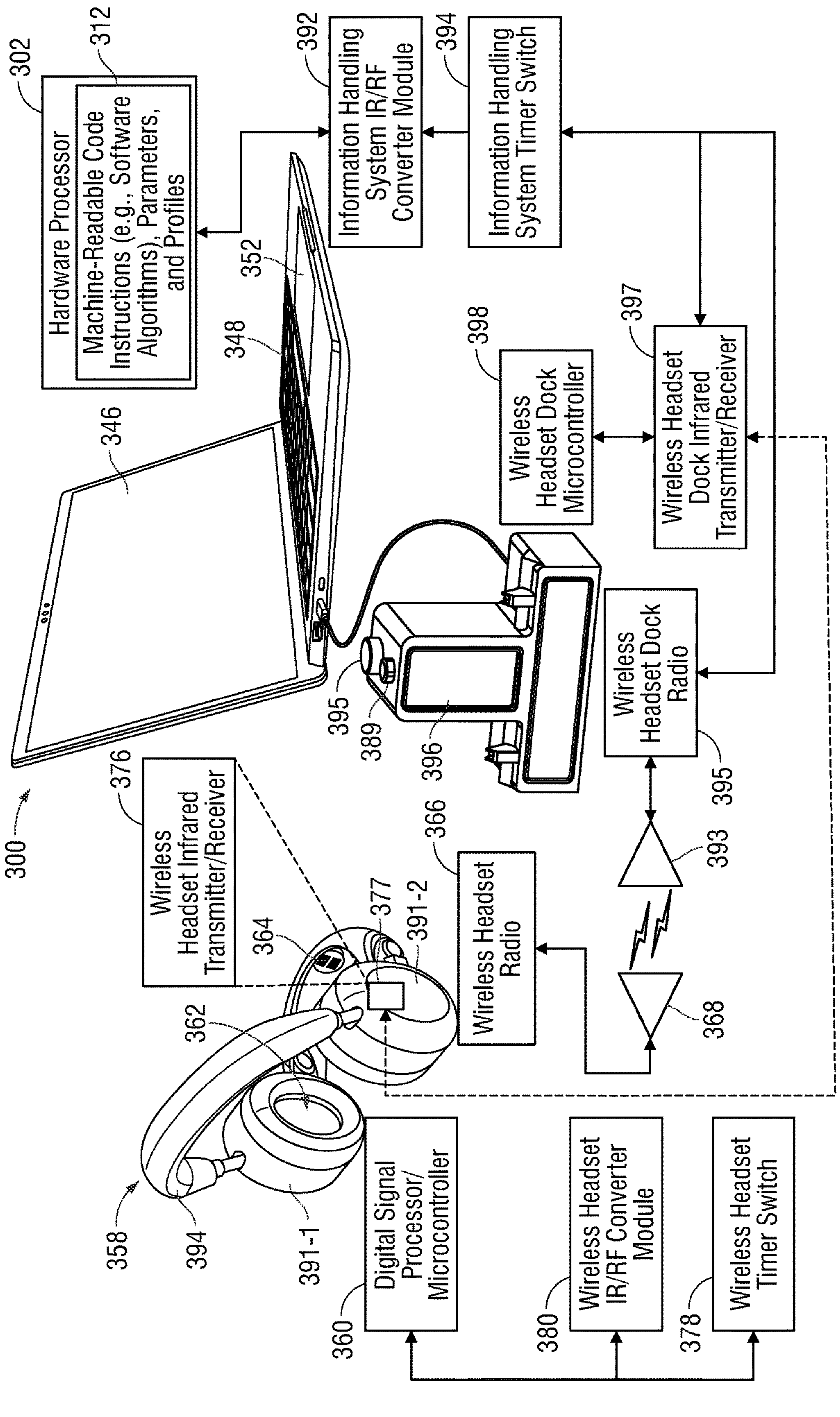
FIG. 3 is a graphic diagram depicting an information handling system including a wireless headset operatively coupled to the information handling system via a wireless headset dock according to an embodiment of the present disclosure.

FIG. 3 is a graphic diagram depicting an information handling system 300 including a wireless headset 358 operatively coupled to the information handling system 300 via a wireless headset dock 396 according to an embodiment of the present disclosure. The information handling system 300 shown in FIG. 3 is shown as a laptop-type information handling system 300. However, the present specification contemplates that any type of information handling system 300, including those operatively coupled to the wireless headset dock 396 in an embodiment. The information handling system 300 shown in FIG. 3 also includes a built-in keyboard 348 and trackpad 352 that both allow a user to provide input to the information handling system 300. In an embodiment, the information handling system 300 may include a number of ports into which the wireless headset dock 396 may be operatively coupled to the information handling system 300. In one embodiment, the wireless headset dock 396 may include a USB port adapter to be operatively coupled to the information handling system 300 via a USB port.

The wireless headset 358 may be wirelessly coupled to the information handling system 300 in an embodiment. The wireless coupling of the wireless headset 358 to the information handling system 300 may be accomplished by the user initiating the wireless headset 358 and information handling system 300 and engaging in, for example, WiFi, Bluetooth®, or other communication protocol pairing processes. When the user initiates the wireless headset 358, the DSP or other microcontroller 360 of the wireless headset 358 may engage in this pairing process in order to allow for data such as audio data to be transmitted from and received at the wireless headset 358. In an embodiment, the pairing process may be facilitated by a wireless headset dock microcontroller 398 of the wireless headset dock 396 and operatively coupled to the information handling system 300 as described herein.

It is appreciated that the wireless headset 358 may be used by the user to provide audio input to the information handling system 300 via a microphone 364 formed in, for example, a boom of the wireless headset 358. The DSP or other microcontroller 360, in an embodiment, may execute computer-readable program code instructions of an analog-to-digital converting module (not shown) in order to convert the analog audio signal from the microphone 364 into a digital audio signal for transmission from the wireless headset 358 to the information handling system 300 via operation of the wireless headset radio 366 and wireless headset antenna 368 or the wireless headset IR transmitter/receiver 376 and wireless headset IR photodiode system 377 as described herein. The wireless headset 358 also includes one or more speakers 362 to provide audio output to the user. As described in embodiments herein, the wireless headset 358 may include two wireless headset earpieces 391-1, 391-2 that are operatively coupled to a headband 391 such that wireless headset earpieces 391-1, 391-2 may be placed over or onto the user's ears when the user is wearing the wireless headset 358. As described herein, the transmission of audio data to the wireless headset 358 may be conducted by the information handling system 300 by operation of a wireless headset dock radio 395 and wireless headset dock antenna 393 or a wireless headset dock IR transmitter/receiver 397 and wireless headset dock IR infrared photodiode system 389.

As described herein, the DSP or other microcontroller 360 may also execute computer-readable program code instructions of a wireless headset timer switch 378 that initially determines whether audio data from the microphone 364 is to be transmitted to the information handling system 300 using the wireless headset radio 366 or the wireless headset IR transmitter/receiver 376. Additionally, execution of the computer-readable program code instructions of the wireless headset timer switch 378 causes the DSP or other microcontroller 360 to determine whether the audio data received from the information handling system 300 is to be received via the wireless headset IR transmitter/receiver 376 or the wireless headset radio 366. In an example embodiment, where the audio data for output at the speakers 362 is to be received from the information handling system 300 via a wireless headset radio 366 using a RF transmission signal, the transmission of the audio data from the microphone 364 is to be transmitted to the information handling system 300 via the wireless headset IR transmitter/receiver 376 using an IR transmission signal. This bifurcates the audio input and audio output to and from the wireless headset 358 using two different transmission protocols and wireless communication forms (RF and IR) thereby securing the audio data with the split wireless audio connectivity and protecting from those hacking attacks described herein.

The execution of the computer-readable program code instructions of the wireless headset timer switch 378 determines the timing of the occurrence and the frequency of occurrence when the transmission protocol and wireless communication form used to transmit the audio data and receive the audio data is switched. Continuing with the example, the execution of the computer-readable program code instructions of the wireless headset timer switch 378 by the DSP or other microcontroller 360 causes the audio data for output at the speakers 362 to switch from being received from the information handling system 300/wireless headset dock 396 via a wireless headset radio 366 using a RF transmission signal to being received from the information handling system 300 via a wireless headset IR transmitter/receiver 376 using an IR transmission signal. Accordingly, the execution of the computer-readable program code instructions of the wireless headset timer switch 378 causes the audio data from the microphone 364 to switch from being transmitted to the information handling system 300 via the wireless headset IR transmitter/receiver 376 using an IR transmission signal to being transmitted to the information handling system 300 via the wireless headset radio 366 using an RF transmission signal. The period of switching is coordinated by the DSP or other microcontroller 360 of the wireless headset 358 and the wireless headset dock microcontroller 398 in an embodiment. Further, the period of switching may be a pre-determined shifting or adjusting period of switching coordinated between the DSP or other microcontroller 360 of the wireless headset 358 and the wireless headset dock microcontroller 398 in additional embodiments. This transmission protocol switching adds further security to the audio data being received and transmitted from and to the wireless headset 358 such that even if a hacker was to gain access to this data using a Bluetooth® wireless eavesdropping method described herein, the sections of data obtained are not complete. The hacker would need line-of-sight access to the IR transmission and also to know the periodic switching being done. In an embodiment, the execution of the computer-readable program code instructions of the wireless headset timer switch 378 may cause the transmission protocols to be switched at any interval of time such as over milliseconds, seconds, or minutes. Further, the switching may have a shifting period of switching pre-arranged between the DSP or other microcontroller 360 of the wireless headset 358 and the wireless headset dock microcontroller 398. Where the frequency of switching from a first transmission protocol to a second transmission protocol is shifted or not known, the ability of a hacker to eavesdrop on this data becomes more difficult such that the eavesdropper will only be able to gather limited data. Further, the IR audio communications would require line of sight interception such as within the room with the user making the hacking more difficult.

In order to transmit and receive audio data from the wireless headset 358 using the wireless headset IR transmitter/receiver 376 and wireless headset IR photodiode system 377, the DSP or other microcontroller 360 may further execute computer-readable program code instructions of a wireless headset IR/RF converter module 380. Where the audio data is received from the information handling system 300 via the wireless headset IR transmitter/receiver 376 using the IR transmission protocol, the execution of the computer-readable program code instructions of the wireless headset IR/RF converter module 380 may convert the IR signals of the received the audio data into digital audio signals prior to the DSP or other microcontroller 360 providing this digital signal to the speakers 362 of the wireless headset 358. Similarly, in those instances where the wireless headset IR transmitter/receiver 376 is used to transmit the audio data received from the microphone 364, the DSP or other microcontroller 360, after executing the computer-readable program code instructions of the analog-to-digital converting module, may execute the computer-readable program code instructions of the wireless headset IR/RF converter module 380 to convert the digital audio signal that defines the audio output into an IR transmission signal for the wireless headset IR transmitter/receiver 376 to transmit that data. In an embodiment, the RF data received at and sent from the wireless headset 358 is also converted into or form digital audio data using the wireless headset IR/RF converter module 380.

In an alternate embodiment, the split wireless audio connectivity may be arranged in a different way such that the wireless headset IR transmission and reception system 376 takes off a portion of the audio data prepared for RF transmission or reception from the wireless headset radio 366 to provide for split wireless audio connectivity. For example, the DSP or other microcontroller 360 provides for audio data to be prepared for RF transmission or reception and further executing computer-readable program code instructions of a wireless headset IR/RF converter module 380 converts the RF data to IR data at the wireless headset radio to split a portion out for transmission via the wireless headset IR transmission and reception system 376 and wireless headset IR photodiode system 377 in this alternate embodiment. In such an embodiment, the wireless headset IR photodiode system 377 may also receive IR wireless data having audio data and convert with the DSP or other microcontroller 360 may further execute computer-readable program code instructions of a wireless headset IR/RF converter module 380 for the wireless headset radio 386 to receive such audio data and the DSP or other microcontroller 360 to utilize the data streams for the speakers 391-1 or 391-2 in other embodiments.

As described herein, the wireless headset dock 396 may include a wireless headset dock IR transmitter/receiver 397 and wireless headset dock IR photodiode system 389 that may send audio data to the wireless headset 358 or receive audio data from the wireless headset 358 depending on which transmission protocol is being used for transmission or reception of audio data in the protocol switching as described herein. As such, where the audio data from the microphone 364 of the wireless headset 358 is to be transmitted using the IR transmission protocol based on the operation of the wireless headset timer switch 378, the wireless headset dock 396 may receive that audio data at the wireless headset dock IR transmitter/receiver 397 and wireless headset dock IR photodiode system 389 built in the housing of the wireless headset dock 396. Additionally, where audio data is to be transmitted to the wireless headset 358 to be provided at the speakers 362 of the wireless headset 358 based on the operation of the wireless headset timer switch 378, the wireless headset dock 396 may transmit that audio data via the wireless headset dock IR transmitter/receiver 397 and wireless headset dock IR photodiode system 389 built thereon. Concurrently, where the audio data from the microphone 364 of the wireless headset 358 is to be transmitted using the RF transmission protocol based on the operation of the wireless headset timer switch 378, the wireless headset dock 396 may receive that audio data at the wireless headset dock radio 395 therein. Additionally, where audio data is to be transmitted to the wireless headset 358 to be provided at the speakers 362 of the wireless headset 358 based on the operation of the wireless headset timer switch 378, the wireless headset dock 396 may transmit that audio data via the wireless headset dock radio 395 therein.

As described herein, the information handling system 300 includes an information handling system timer switch 394. In an embodiment, the wireless headset dock radio 395 and wireless headset dock IR transmitter/receiver 397 is operatively coupled to an information handling system timer switch 394 that includes computer-readable program code instructions executable by the hardware processor 302 of the information handling system 300. Similar to and coordinated with the wireless headset timer switch 378, the information handling system timer switch 394 may coordinate when the wireless headset dock 396 is to transmit audio data from the information handling system 300 to the wireless headset 358 and receive audio data from the information handling system 300 between RF and IR wireless communication links. In an embodiment, one of the wireless headset timer switch 378 and the information handling system timer switch 394 may act as a master device that sets the frequency of occurrence and timing of the occurrence of the switch between transmitting audio data via RF transmissions while receiving audio data via IR transmissions and transmitting audio data via IR transmissions while receiving audio data via RF transmissions. In an embodiment, the wireless headset timer switch 378 of the wireless headset 358 may act as the master timer switch such that data indicating the frequency of occurrence and timing of the occurrence of the switch between transmitting audio data via RF transmissions while receiving audio data via IR transmissions and transmitting audio data via IR transmissions while receiving audio data via RF transmissions is sent to the wireless headset dock microcontroller 398 and relayed and used by the hardware processor 302 of the information handling system 300 to coordinate the switching of the transmission methods. The timer switching may be coordinated at the beginning of the split audio data wireless connectivity and may be updated at various periods, different from the audio data wireless form switching period, to ensure ongoing coordination in some embodiments.

The information handling system 300 also includes an information handling system IR/RF converter module 392. The hardware processor 302 of the information handling system 300 may execute computer-readable program code instructions (e.g., machine-readable code instructions 212) of the information handling system IR/RF converter module 392 to convert any IR data or RF data into digital audio data or vice-versa. For example, where the audio data is received from the wireless headset 358 via the wireless headset dock IR transmitter/receiver 397 and the wireless headset dock IR photodiode system 389 using the IR transmission protocol, the execution of the computer-readable program code instructions of the information handling system IR/RF converter module 392 may convert the IR signals defining the audio data into digital audio signals prior to the hardware processor 302 transmitting this digital audio signal to, for example, another remote information handling system during a videoconferencing session or online gaming session. Similarly, in those instances where the wireless headset IR transmitter/receiver 376 and the wireless headset dock IR photodiode system 377 is used to transmit the audio data received from a remote information handling system, the hardware processor 302 may execute the computer-readable program code instructions of the information handling system IR/RF converter module 392 to convert the digital audio signal that defines the audio output into an IR transmission signal for the wireless headset dock IR transmitter/receiver 397 to transmit that audio data to the wireless headset 358. A similar process may occur with execution of code instructions for the wireless headset IR/RF converter module 380 at wireless headset 358 in embodiments herein.

Figure 4:
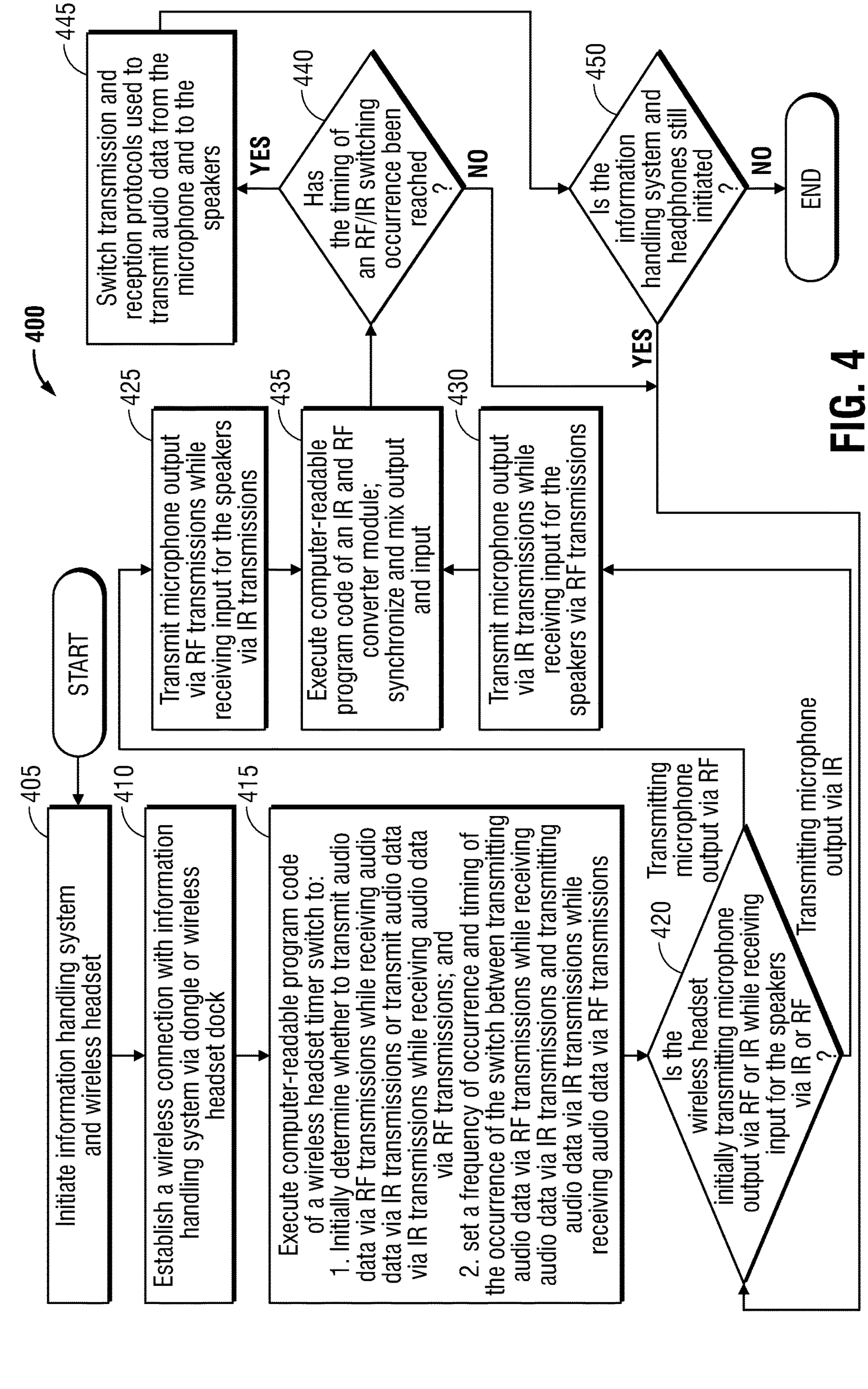
FIG. 4 is a flow chart showing a method of transceiving split wireless audio data connectivity between a peripheral device and an information handling system according to another embodiment of the present disclosure.

FIG. 4 is a flow chart showing a method 400 of transceiving audio data between a peripheral device and an information handling system according to another embodiment of the present disclosure. As described herein, the peripheral device may be any type of peripheral device that is capable of receiving audio data from an information handling system to provide audio output via a speaker and transmitting audio data from a microphone to the information handling system. An embodiment, the peripheral device includes a wireless headset as described herein. Thus, although the present specification describes the peripheral device as a wireless headset, it is appreciated that this is merely an example of a peripheral device that can be used in the present system and methods described herein.

At block 405, the method 400 may include initiating the information handling system and wireless headset. In an embodiment, the information handling system may be initiated via the user actuating a power button that causes a booting sequence to be initiated in order to execute a BIOS and OS at the hardware processor of the information handling system. In an embodiment, the initiation of the headphones may include, for example, actuating a switch, actuating a motion sensor or touch sensor, removing the headphones from a case, or other initiation trigger. In an embodiment, the wireless headset may include a wireless headset dock that the wireless headset may be operatively coupled to when not in use in order to hold the wireless headset as well, in an embodiment, charge the wireless headset batteries as described herein. The removal of the wireless headset from the wireless headset dock may cause the initializing of the wireless headset with a wireless headset PMU providing power to the DSP microcontroller, or other hardware processing resource within the wireless headset.

The method 400, at block 410, may continue with the wireless headset establishing a wireless connection with the information handling system via a dongle or wireless headset dock. As described herein, the wireless coupling of the wireless headset to the information handling system may be accomplished by the user initiating the wireless headset and information handling system and engaging in, for example, WiFi, Bluetooth®, or other communication protocol pairing processes. When the user initiates the wireless headset, the DSP microcontroller, or other hardware processing resource of the wireless headset may engage in this pairing process in order to allow for data such as audio data to be transmitted from and received at the wireless headset via an RF wireless link. Similarly, for infrared pairing the wireless headset to the information handling system, a wireless headset IR photodiode system may transmit an IR pairing signal which is received by, in the example shown in FIG. 2, a dongle IR photodiode system that includes pairing data such as pairing authorization data. Thus, in an embodiment, the pairing process may proceed using an IR transmission instead of an RF transmission. In an embodiment, these IR pairing communications would require line of sight interception such as within the room with the user.

It is appreciated that the wireless headset may be used by the user to provide audio input to the information handling system via a microphone formed in, for example, a boom of the wireless headset. The DSP microcontroller, or other hardware processing resource, in an embodiment, may execute computer-readable program code instructions of an analog-to-digital converting module in order to convert the analog audio signal from the microphone into a digital audio signal for transmission from the wireless headset to the information handling system via operation of the wireless headset radio and wireless headset antenna or the wireless headset IR transmitter/receiver and wireless headset IR photodiode system as described herein. The wireless headset also includes one or more speakers to provide audio output to the user. As described in embodiments herein, the wireless headset may include two wireless headset earpieces that are operatively coupled to a headband such that wireless headset earpieces may be placed over or onto the user's ears when the user is wearing the wireless headset. As described in some embodiments herein, the transmission of audio data to the wireless headset may be conducted by the information handling system by operation of a dongle radio and dongle antenna or a dongle IR transmitter/receiver and dongle infrared photodiode system. Additionally, as described in some embodiments herein, the transmission of audio data to the wireless headset may be conducted by the information handling system by operation of a wireless headset dock radio and wireless headset dock antenna or a wireless headset dock IR transmitter/receiver and wireless headset dock infrared photodiode system.

At block 415, the method 400 includes executing computer-readable program code of a wireless headset timer switch to initially determine whether to transmit audio data via RF transmissions while receiving audio data via IR transmissions or to transmit audio data via IR transmissions while receiving audio data via RF transmissions to provide an added layer of security to wireless audio data transmissions with a periodically switched wireless audio connectivity. In an embodiment, the audio data transmitted to the information handling system may originate from the microphone of the wireless headset. As such, prior to transmission of this audio input at the microphone, the analog audio signal is to be converted into a digital audio signal regardless of whether the audio data from the microphone is transmitted to the information handling system via IR transmission or RF transmission. Additionally, in an embodiment, as audio data is received at the wireless headset from the information handling system via either the dongle or the wireless headset dock, the audio data is provided to the speakers of the wireless headset as output for the user to hear.

Additionally, at block 415, the execution of the computer-readable program code of a wireless headset timer switch sets a frequency of occurrence and timing of the occurrence of the switch between transmitting audio data via RF transmissions while receiving audio data via IR transmissions and transmitting audio data via IR transmissions while receiving audio data via RF transmissions. In an embodiment when the audio data for output at the speakers of the wireless headset is to be received from the information handling system (e.g., through the operation of a dongle or the wireless headset dock) via a wireless headset radio using a RF transmission signal, the transmission of the audio data from the microphone is transmitted to the information handling system via the wireless headset IR transmitter/receiver using an IR transmission signal. A transition or switching between these IR and RF modes of transmissions may be coordinated via execution of the computer-readable program code instructions of a wireless headset timer switch such that the audio data for output at the speakers of the wireless headset is then received from the information handling system (e.g., through the operation of a dongle or the wireless headset dock) via a the wireless headset IR transmitter/receiver using the IR transmission signal while the transmission of the audio data from the microphone is transmitted to the information handling system via the wireless headset radio using the RF transmission signal. This bifurcates the audio input and audio output to and from the wireless headset using two different transmission protocols thereby further securing the audio data and protecting from those hacking attacks described herein.

Therefore, at block 420, the method 400 includes determining whether the wireless headset is transmitting microphone output via RF or IR while receiving input for the speakers via IR or RF based on the execution of the computer-readable program code instructions of a wireless headset timer switch making the determination as to which transmission protocols and hardware between IR and RF to use when transmitting audio to the information handling system and receiving audio data from the information handling system.

Where the DSP microcontroller, or other hardware processing resource of the wireless headset has determined that the audio data originating from the microphone is being transmitted from the wireless headset using RF transmission signals the method 400 proceeds to block 425. At block 425, the method 400 includes, for a period of time, transmitting microphone output at the wireless headset via RF transmissions while receiving input for the speakers of the wireless headset via IR transmissions. As described herein, the RF transmissions are transmitted to (or received from) the information handling system using the wireless headset radio and antenna while the IR transmissions are received from (or transmitted to) the information handling system via the wireless headset IR transmitter/receiver and IR photodiode systems. These transmissions are either sent or received using a dongle radio and dongle IR transmitter/ receiver or a wireless headset dock radio and wireless headset dock IR transmitter/receiver in embodiments described herein.

Where the DSP, microcontroller, or other hardware processing resource of the wireless headset has determined that the audio data originating from the microphone is being transmitted from the wireless headset using IR transmission signals the method 400 proceeds to block 430. At block 430, the method 400 includes, for a period of time, transmitting microphone output at the wireless headset via IR transmissions while receiving input for the speakers of the wireless headset via RF transmissions.

At block 435, the execution of the computer-readable program code instructions of an IR and RF converter module by the DSP, microcontroller, or other hardware processing resource causes the IR and RF transmissions to be converted into digital audio signals for the speaker to provide output to the user when appropriate. A similar IR and RF converter module may be executed by the dongle hardware microcontroller or wireless headset dock microcontroller in order to convert those IR and RF signals into a digital audio data format for use at the information handling system.

Also at block 435, the DSP, microcontroller, or other hardware processing resource may execute computer-readable program code of a synchronization and mixing module, for example, to cause the received input from the information handling system and output to the information handling system to be mixed and coordinated such that the output from the wireless headset from the microphone and the input from the information handling system to the speakers are sent in received appropriately.

The method 400 includes, at block 440, with the DSP, microcontroller, or other hardware processing resource determining whether the timing of occurrence to switch the transmission modes between IR and RF has been reached. As described herein, the execution of the computer-readable program code instructions of the wireless headset timer switch may cause the transmission protocols between IR and RF to be switched at any interval of time such as over milliseconds, seconds, or minutes. Such an interval is coordinated between the wireless headset and a dongle, wireless headset dock or information handling system at the outset of the split wireless audio connectivity in an embodiment. The interval may be updated between the wireless headset and a dongle, wireless headset dock or information handling system at a period that is different from the switching period (e.g., less frequently) in further embodiments during the split wireless audio connectivity. Additionally, the interval of time for switching between IR and RF for audio data transmission and reception may be a shifting interval in some embodiments that is coordinated between the wireless headset and a dongle, wireless headset dock or information handling system. Where the frequency of switching from a first transmission protocol to a second transmission protocol is provided for a given period of time that is coordinated only between the wireless headset and a dongle, wireless headset dock or information handling system, the ability of a hacker to eavesdrop on this data via RF or IR becomes more difficult such that the eavesdropper will only be able to gather data that is disjointed and unusable. Where the time or occurrence for switching between IR and RF has not been reached, the method 400 returns to block 420 as described herein.

Where the timing of occurrence for switching between RF and IR has been reached, the DSP, microcontroller, or other hardware processing resource of the wireless headset may switch transmission and reception protocols used to transmit audio data from the microphone and to the speakers respectively. This allows the switching to occur at any frequency so that the audio data is protected from Bluetooth eavesdropping from hackers.

At this point, the method 400 continues to block 450 with a determination as to whether the information handling system and wireless headset are still initiated. Where the information handling system and wireless headset are not initiated, the method 400 may end here. Where the information handling system and wireless headset are still initiated, the method 400 may continue to block 420 to continue to monitor the audio data for which form of wireless connectivity is currently being used for audio data received at the wireless headset and which form of wireless connectivity is being used for audio data transmitted from the wireless headset during a particular switching interval and whether the interval of switching occurrence has been reached. Otherwise, if the information handling system or wireless headset is not still initiated, the method 400 may end here.

The blocks of the flow diagram of FIG. 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A method of transceiving audio data between a peripheral device and an information handling system, comprising:

transmitting audio data generated from a microphone from the peripheral device to the information handling system via a peripheral device infrared (IR) photodiode system with an IR transmission during a first period of time and receiving audio data from the information handling system for playback at a speaker of the peripheral device via a radio frequency (RF) antenna with an RF reception during the first period of time;

executing computer-readable code instructions of a peripheral device timer switch, with a hardware microprocessor of the peripheral device, to switch alternatively to transmitting audio data to the information handling system via the RF frequency antenna with an RF transmission during a second period of time and receiving audio data from the information handling system via the peripheral device IR photodiode system with an IR reception during the second time period of time, wherein the duration of the first period of time and duration of the second period of time establishes a frequency of switching between periods of the IR transmission with the RF reception and periods of the RF transmission with the IR reception that is coordinated only between the peripheral device and a dongle, wireless headset docking station, or receiver on the information handling system; and alternatively switching, with the hardware microprocessor executing computer-readable code instructions of the peripheral device timer switch, between periods of IR transmissions with RF receptions and periods of RF transmission with IR receptions, wherein the alternatively switching is performed during transmitting audio data generated from the microphone and receiving audio data for playback a the speaker by the peripheral device during subsequent time periods to interfere with eavesdropping of the audio data.

2. The method of claim 1 further comprising:

executing, with the hardware microprocessor, the peripheral device timer switch to coordinate the alternating switching between an IR wireless link and an RF wireless link to receive and send the audio data with split wireless audio connectivity with the information handling system at the beginning of the split wireless audio connectivity between the peripheral device and the information handling system.

3. The method of claim 1 further comprising:

executing, with the hardware microprocessor, an IR/RF converter module to convert the received IR transmission to an audio digital signal.

4. The method of claim 1 further comprising:

executing, with the hardware microprocessor, an IR/RF converter module to convert the audio data into an IR transmission to the information handling system.

5. The method of claim 1, wherein the peripheral device is a wireless headset including a wireless headset IR transmitter/receiver, and wherein the wireless headset transmits and receives the IR transmission to and from, respectively, the dongle operatively coupled to the information handling system via the wireless headset IR transmitter/receiver in an IR wireless link and alternately receives and transmits the RF receptions and the RF transmissions from and to the dongle via a wireless headset radio and a wireless headset antenna.

6. The method of claim 1 wherein the first time period, the second time period, and the subsequent time periods are shifting in duration by the peripheral device timer switch and which is coordinated with the information handling system to interfere with eavesdropping of the audio data generated from the microphone and the audio data received for playback at the speaker.

7. The method of claim 1, wherein the peripheral device is a wireless headset including a wireless headset IR transmitter/receiver, and wherein the wireless headset transmits and receives the IR transmission to and IR reception from, respectively, the wireless headset docking station operatively coupled to the information handling system via the wireless headset IR transmitter/receiver in an IR wireless link and alternately receives and transmits RF transmission and the RF transmissions from and to the wireless headset docking station via a wireless headset radio and a wireless headset antenna.

8. The method of claim 1 further comprising:

executing the computer-readable program code of the peripheral device timer switch to relay to the information handling system the duration of the first period of time and the duration of the second period of time that establishes the frequency of the switching between periods of transmitting the audio data to the information handling system via the IR transmission while receiving the audio data from the information handling system via the RF reception and periods of transmitting the audio data to the information handling system via the IR transmission while receiving the audio data from the information handling system via the RF reception to coordinate a split wireless audio connectivity between the peripheral device and the information handling system.

9. The method of claim 1 further comprising:

executing computer-readable program code of the peripheral device timer switch to set a switching timing such that when the switching timing has passed, the hardware microprocessor of the peripheral device switches from transmitting the audio data to the information handling system via the IR transmission while receiving the audio data from the information handling system via the RF reception to transmitting the audio data to the information handling system via the RF transmission while receiving the audio data from the information handling system via the IR reception.

10. A wireless headset, comprising:

a hardware microprocessor;

a speaker;

a microphone; and a wireless headset power management unit to provide power to the hardware microprocessor, the speaker, and the microphone;

the hardware microprocessor to execute computer-readable program code of a wireless headset timer switch to alternate for alternating first periods of time and second periods of time between:

a wireless headset infrared (IR) photodiode system transmitting audio data generated from the microphone to an information handling system via an IR transmission and a radio antenna receiving audio data from the information handling system for playback on the speaker via a radio frequency (RF) reception during first periods of time; and the radio antenna transmitting audio data generated from the microphone to the information handling system via an RF transmission and the wireless headset IR photodiode system receiving audio data from the information handling system for playback on the speaker via an IR reception during second periods of time, wherein a duration of the first periods of time and a duration of the second periods of time establishes a frequency of switching between periods of IR transmission with RF reception and periods of RF transmission with IR reception that is securely coordinated only between the peripheral device and a dongle, headset docking station, or receiver on the information handling system to interfere with eavesdropping of the audio data.

11. The wireless headset of claim 10 further comprising: the hardware microprocessor to execute an IR/RF converter module to convert the received IR reception to an audio digital signal.

12. The wireless headset of claim 10 further comprising: the hardware microprocessor to execute an IR/RF converter module to convert the received RF reception to an audio digital signal.

13. The wireless headset of claim 10 further comprising: a wireless headset IR transmitter/receiver to transmit and receive the IR transmission and the IR reception via the wireless headset IR photodiode system from and to, respectively, the dongle operatively coupled to the information handling system.

14. The wireless headset of claim 10, wherein the headset timer switch alternates between the IR transmission with the RF reception and the RF transmission with the IR reception at a period interval for the alternating first periods of time and second periods of time that is shared in secure coordination with the information handling system, the dongle operatively coupled to the information handling system, or the headset docking station operatively coupled to the information handling system.

15. The wireless headset of claim 10 further comprising: the wireless headset including a wireless headset IR transmitter/receiver to transmit and receive the IR transmission and the IR reception via the wireless headset IR photodiode system from and to, respectively, the headset docking station operatively coupled to the information handling system via a wired connection.

16. The wireless headset of claim 15 further comprising: the hardware microprocessor of the wireless headset to execute computer-readable program code of the wireless headset timer switch to relay, to the information handling system, the dongle operatively coupled to the information handling system, or the wireless headset dock operatively coupled to the information handling system, the frequency and occurrence of the switch for alternating between first periods of time for transmitting audio data to the information handling system via the IR transmission while receiving audio data from the information handling system via the RF reception and the second periods of time for transmitting audio data to the information handling system via the RF transmission while receiving audio data from the information handling system via the IR reception by utilizing a split wireless audio connectivity.

17. A wireless headset, comprising:

a hardware microprocessor;

a speaker;

a microphone; and a wireless headset power management unit to provide power to the hardware microprocessor, the speaker, and the microphone;

the hardware microprocessor to execute computer-readable program code of a wireless headset timer switch to alternate between:

a wireless headset infrared (IR) photodiode system transmitting microphone audio data generated from the microphone to an information handling system via an IR transmission and a radio antenna receiving speaker audio data from the information handling system for playback on the speaker via a radio frequency (RF) reception depending on coordinated alternating time periods that are coordinated with the information handling system; and the radio antenna transmitting the microphone audio data to the information handling system via an RF transmission and the wireless headset IR photodiode system receiving speaker audio data from the information handling system via an IR reception depending on the coordinated alternating time periods; and the hardware microprocessor to execute the computer-readable program code of the wireless headset timer switch to define a frequency and occurrence of the alternating switching for the coordinated alternating time periods between transmitting microphone audio data to the information handling system via the IR transmission while receiving speaker audio data from the information handling system via the RF transmission and transmitting microphone audio data to the information handling system via the IR transmission while receiving speaker audio data from the information handling system via the RF transmission, wherein the frequency and occurrence of the coordinated alternating time periods for the alternating switching between the coordinated alternating time periods of the IR transmission of microphone audio data with the RF reception of speaker audio data and the coordinated alternating time periods of the RF transmission of microphone audio data with the IR reception of speaker audio data is securely coordinated only between the peripheral device and a dongle, wireless headset docking station, or receiver on the information handling system to interfere with eavesdropping of the microphone audio data and the speaker audio data.

18. The wireless headset of claim 17 further comprising: the wireless headset including the wireless headset IR photodiode system to transmit and receive the IR transmission of the microphone audio data and the IR reception of the speaker audio data from and to, respectively, the wireless headset docking station operatively coupled to an information handling system via a wired connection.

19. The wireless headset of claim 17, wherein the headset timer switch alternates between the IR transmission and the RF transmission of the microphone audio data and between the RF reception and the IR reception of the speaker audio data at a shifting period interval for the coordinated alternating time periods that are securely coordinated with the information handling system.

20. The wireless headset of claim 17 further comprising: the wireless headset including the wireless headset photodiode system to transmit and receive the IR transmission of the microphone audio data and the IR reception of the speaker audio data from and to, respectively, the dongle operatively coupled to the information handling system.

* * * * *